UNITED STATES PATENT OFFICE.

MERCER REYNOLDS, OF ST. ELMO, TENNESSEE.

METHOD OF MAKING CATALYZERS.

1,210,367. Specification of Letters Patent. Patented Dec. 26, 1916.

No Drawing. Application filed February 18, 1916. Serial No. 79,177.

*To all whom it may concern:*

Be it known that I, MERCER REYNOLDS, a citizen of the United States, residing at St. Elmo, Tennessee, have invented certain new and useful Improvements in Methods of Making Catalyzers, of which the following is a specification.

This invention relates to the production of catalyzers such as are used in the hydrogenation of fatty materials of the type of fatty acids, their glycerids and esters.

The object of the invention is to reduce the material from which the catalyzer is made by a reducing gas that is non-explosive.

A further object of the invention is to produce the catalyzer by other and cheaper reducing agents than hydrogen, the one at present generally used.

With these objects in view, the invention consists in the use of a non-explosive reducing gas or mixture of gases, as particularly pointed out in the claims, it being understood that I do not intend to limit myself to the specific gases named herein, as I may use all of them or their equivalents either separately, collectively or in any combination thereof.

In the hydrogenation of fats as above specified, it is necessary to first make an active catalyzer and then use the catalyzer in the presence of the fatty materials to be treated during hydrogenation. The catalyzer is usually made from some metallic salt which among other things is treated with hydrogen for the purpose of reducing it. Hydrogen, however, has the disadvantage of being explosive, which is a constant menace because the reduction of the material being treated usually takes place in a drum or cylinder that is heated by a flame so that the slightest defect in the drum would permit the escape of hydrogen into the flame with disastrous results. A further disadvantage is its relative high cost.

Instead of hydrogen, I find ammonia may be used with the same effect but without the cost and explosiveness. Or I may use carbon monoxid, although this must be rendered non-inflammable by mixture with an inert gas. Also I find it is possible to mix hydrogen with inert gas so that it is rendered non-explosive. This inert gas may be either carbon dioxid or nitrogen or a mixture of both, their proportions being immaterial so long as the percentage of reducing gas does not reach the explosive point. I have found even 5% non-explosive. The inert gas or gases appear to envelop the reducing gas in the mixture so that it is rendered non-explosive but does not combine with it to change its reducing quality in any degree. While ammonia may be used alone, it may be also mixed with the inert gas. My preferred mixture is nitrogen, carbon dioxid and carbon monoxid and my preferred method of making it is to draw air through burning coke or other incandescent material in a closed container; wash the resulting product for ash and then direct it into the reducing drum. The air after passing over the coke becomes a mixture of gases containing approximately 78% nitrogen, 20% carbon dioxid and 2% carbon monoxid. This mixture is very efficient as a reducing agent, is very cheap to make and is non-explosive. An unexpected effect from using this reducing gas is that the resulting catalyzer may be exposed to the atmosphere for about 30 minutes without detriment thereto. After preparation, the catalyzer is inserted in a container containing the fatty material to be saturated with hydrogen which is also inserted in the container.

What I claim is:—

1. The hereinbefore described method of producing a catalyzer which consists in subjecting the unreduced catalytic material to the action of a reducing gas non-explosive in the presence of oxygen.

2. The hereinbefore described method of producing a catalyzer which consists in subjecting the unreduced catalytic material to the action of a reducing gas including carbon monoxid, said reducing gas being non-explosive in the presence of oxygen.

In testimony whereof, I affix my signature.

MERCER REYNOLDS.